United States Patent
Marchant

[11] Patent Number: 6,094,486
[45] Date of Patent: Jul. 25, 2000

[54] SECURITY APPARATUS FOR DATA TRANSMISSION WITH DYNAMIC RANDOM ENCRYPTION

[76] Inventor: Brian E. Marchant, 285 Grand View Dr., Woodside, Calif. 94062

[21] Appl. No.: 09/359,857

[22] Filed: Jul. 23, 1999

Related U.S. Application Data

[60] Provisional application No. 60/050,176, Jun. 19, 1997.

[51] Int. Cl.[7] .................................................. H04L 9/00
[52] U.S. Cl. .............................. 380/52; 380/28; 713/184; 713/202
[58] Field of Search ........................... 713/172; 380/52, 380/264, 28, 45, 42; 711/219, 220, 202, 209; 707/9, 100

[56] References Cited

U.S. PATENT DOCUMENTS

| | | | |
|---|---|---|---|
| 4,398,244 | 8/1983 | Chu et al. | 712/244 |
| 4,799,258 | 1/1989 | Davies . | |
| 5,146,500 | 9/1992 | Maurer . | |
| 5,199,069 | 3/1993 | Barrett et al. | 380/28 |
| 5,245,658 | 9/1993 | Bush et al. | 380/28 |
| 5,440,640 | 8/1995 | Anshel et al. . | |
| 5,452,358 | 9/1995 | Normile et al. | 380/42 |
| 5,517,614 | 5/1996 | Tajima et al. | 714/1 |
| 5,548,648 | 8/1996 | Yorke-Smith | 713/193 |
| 5,623,637 | 4/1997 | Jones et al. . | |
| 5,724,423 | 3/1998 | Khello . | |
| 5,742,686 | 4/1998 | Finley | 380/28 |
| 5,751,808 | 5/1998 | Anshel et al. . | |
| 5,778,071 | 7/1998 | Caputo et al. . | |
| 5,832,091 | 11/1998 | Tomko et al. . | |

FOREIGN PATENT DOCUMENTS

0797329 A1  9/1997  European Pat. Off. .

*Primary Examiner*—Gail O. Hayes
*Assistant Examiner*—Christopher M. Tucker
*Attorney, Agent, or Firm*—Hickman Stephens Coleman & Hughes, LLP

[57] ABSTRACT

A security apparatus including a number input device (302), an address register (312) responsive to the number input device, an encryption schema memory (316) addressable by the address register to produce an output code and a relative address code, and address incrementing logic (310) responsive the relative address code and operative to increment the address register. The apparatus also preferably includes a PIN register (304) coupled to the number input device, a public code register (306) coupled to the number input device, and merging logic (308) merging outputs of the PIN register and the public code register to be input to the address register. The apparatus also preferably includes an output shift register operative to shift out the output code of the encryption schema memory. The encryption schema memory can be read only memory, writeable memory, or both.

19 Claims, 11 Drawing Sheets

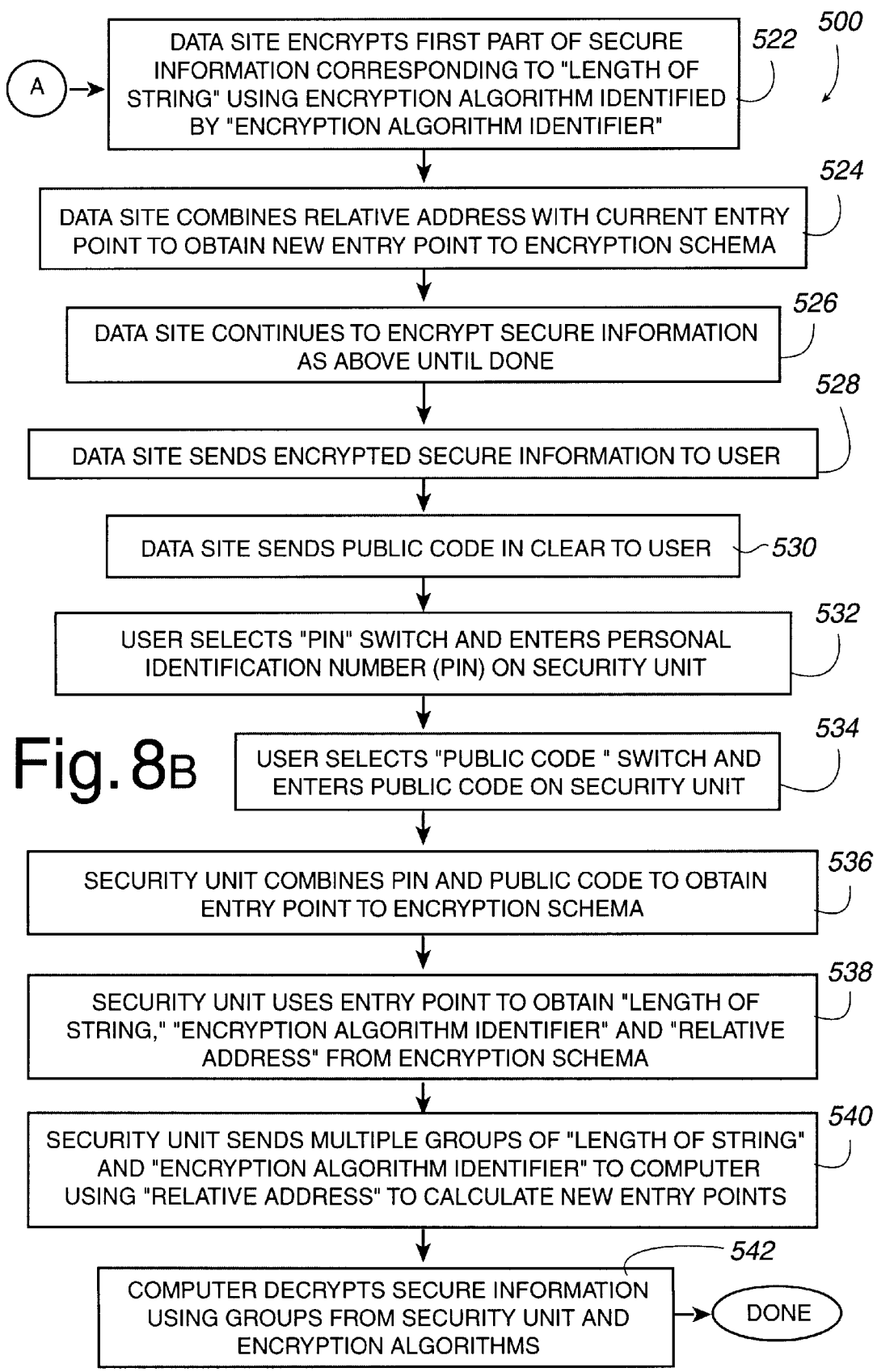

SECURITY APPARATUS FOR DATA TRANSMISSION WITH DYNAMIC RANDOM ENCRYPTION

CROSS REFERENCE TO RELATED APPLICATIONS

The present application represents the National Phase filing of International Application No. PCT/U.S. Pat. No. 98/12,578 filed Jun. 15, 1998, which application claims priority of U.S. Provisional Application No. 60/050,176 filed Jun. 19, 1997, under 35 U.S.C. §119(e), the subject matter disclosed therein being incorporated herein by reference in its entirety.

DESCRIPTION

1. Technical Field

The present invention relates generally to transmission of data in a secure fashion between computer systems. More specifically, the present invention relates to a portable security apparatus that attaches to a computer and makes use of random encryption algorithms that change.

2. Background Art

Within any computing system or within any network, data is often transmitted between two points such as between a server computer and a user's host computer. At times, this information may be transmitted over a local area network (LAN), a wide area network (WAN), over a corporate Intranet or Internet, and also over the Internet. Because data transmission makes use of a variety of media such as cables, telephone wires, microwaves, satellites, etc., the security of the data is often at risk when it is transmitted. In other words, when confidential or private information is being transmitted there is always a risk that the information can be read by unauthorized users.

In addition, there is the problem of an unauthorized user masquerading as the true user of the information, and thus receiving information that he or she is not authorized to view. Thus, confidential information needs not only a secure form of transmission, but also a technique for ensuring that the end recipient is authorized to view such information. A variety of secure transmission techniques rely upon data being encrypted by a complex, single encryption algorithm. However, relying upon only one encryption algorithm for transmission of data is somewhat risky in that the encryption algorithm may eventually be broken. Other techniques change an encryption key on a monthly or daily basis, or upon some outside event; however, these encryption algorithms are still subject to be broken for any given message. Furthermore, many of these techniques store a fixed encryption algorithm and an encryption key within the user's computer. Such techniques are also at risk because a computer hacker may be able to break into the user's computer and retrieve such an encryption algorithm and key and/or any password or personal identification number (PIN) that may be used as an encryption key. If the fixed encryption algorithm is obtained, a hacker may be able to read unauthorized data.

Therefore, a simple, easy to use, portable and inexpensive data security module and technique is desired that allows for secure transmission of data and that does not suffer any of the drawbacks of the prior art.

DISCLOSURE OF THE INVENTION

To achieve the foregoing, and in accordance with the purpose of the present invention, a security unit and technique is disclosed that attaches outside of a user's computer and assists in decrypting encrypted information using random encryption algorithms that may change frequently within the body of a single message.

The security unit attaches conveniently to an easily accessible port of a laptop or desktop computer and includes an encryption schema which is a random array of bits. The same encryption schema is also stored at the data site where the secure data originates before it is transmitted to the user's computer. A personal identification number (PIN) is known only to the data site and to the user, and is not transmitted with the secure information. The data site uses a public code combined with the PIN to randomly access the encryption schema in order to determine not only which encryption algorithm to use, but also to determine how many bytes of the message to transmit using that encryption algorithm. Once a number of bytes are sent using a random encryption algorithm, the data site changes to a new random encryption algorithm for another set of bytes whose length is also randomly determined. Once the encrypted message is sent to the user (or at any time), the user in a similar fashion uses the public code and the secret PIN in order to access the encryption schema within his security unit in order to determine not only which encryption algorithm to use, but also to determine how many bytes should be decrypted using that encryption algorithm. The encryption algorithm may also change randomly during the message based upon random bits within the encryption schema.

The present invention provides a variety of advantages over the prior art. In one embodiment, the security unit is external to the computer, thus preventing any hacker who can gain access to the computer from gaining access to the encryption schema or PIN stored within the security unit. By plugging into a port of the computer, the security unit is still able to provide decryption information to the computer, yet the encryption schema stored within the memory of the external security unit is not able to be read by anyone gaining unauthorized access to the computer itself. In other words, the encryption schema that defines which encryption algorithm to use and how many bytes to decrypt using that algorithm along with the user's PIN is not retained within the computer. In one particular embodiment, the security unit conveniently plugs into a mouse port located near the front of the computer system, thus allowing convenient attachment. Also, an external unit allows the security unit to be extremely portable and attachable to any suitable computer.

In addition, the security unit is a simple device enabling it to be built inexpensively and small, which means it is more portable. The unit is especially useful for business travelers who need to access large amount of corporate information while on the road. The unit is portable, and the encryption technique used is suitable for the security of large amounts of information.

Also, the security unit does not need an enormous amount of processing power that is sometimes required with other complex encryption techniques. The actual decryption of an encrypted message is performed on the CPU of the host computer, although identification of which encryption algorithm to use and how many bytes to decode using each algorithm is determined externally in the security unit. Also, the security unit does not need its own clock or battery power. The security unit is able to draw any needed power from a pin of the port to which it is attached. Because the present invention uses random algorithms, it does not need to rely upon a clock to provide a time element for computing either an algorithm or a key.

Because the user PIN is only present at the data site and in the user's head and is never transmitted over a network, any encrypted message is more difficult to decrypt by unauthorized people. Furthermore, although the PIN is entered into the security unit, the PIN is never transmitted into the host computer. Also, in one particular embodiment, the PIN is entered first onto the security unit and the public code is entered second. Thus, upon entering the public code the PIN is removed from the outside of the security unit. Thus, the PIN is never left unprotected on the outside of the security unit.

Having a unique encryption schema per security unit also has advantages. Although it is contemplated that any number of security units distributed to multiple users might use the same encryption schema, for higher security it may be desirable to have a unique encryption schema for every security unit. The encryption schema is a random array of bits that provides for even higher security in choosing an encryption algorithm and for choosing how many bytes of a message to encrypt using an algorithm. A combination of the public code and the PIN provide a first random entry into the encryption schema. From this entry point, a random set of bits identify a particular encryption algorithm to use for decryption, and a random set of bits identify how many bytes of the message to decrypt using that algorithm. Because these bits are random, the encryption algorithm chosen for a portion of the message is entirely random and it is difficult to break this code. Also, because the random bits also identify a length of string to encrypt, the encryption algorithm changes randomly within a given message at random points within that message. Thus, the encryption algorithm changes within a given message, but this change is completely random and is not transmitted over the network or along with the encrypted message. Using a random choice of encryption algorithms on a randomly chosen length of a string results in a code that is nearly impossible to break.

Furthermore, a reset feature allows a user to reset the encryption process if a message is unreadable for any reason. Additionally, the data site itself may force a reset, provide a new public code and/or require the user to reenter his PIN in order to provide a greater level of security. In addition, it is contemplated that secure data may not only be sent from a data site to a user's computer, but also from a user's computer to the data site or to other computers and/or mass storage devices.

BRIEF DESCRIPTION OF THE DRAWINGS

FIGS. 8A and 8B are flowcharts illustrating an embodiment of a technique by which secure data is transferred to a computer and is decrypted with the assistance of a security unit of the present invention.

BEST MODES FOR CARRYING OUT THE INVENTION

Figure 1:
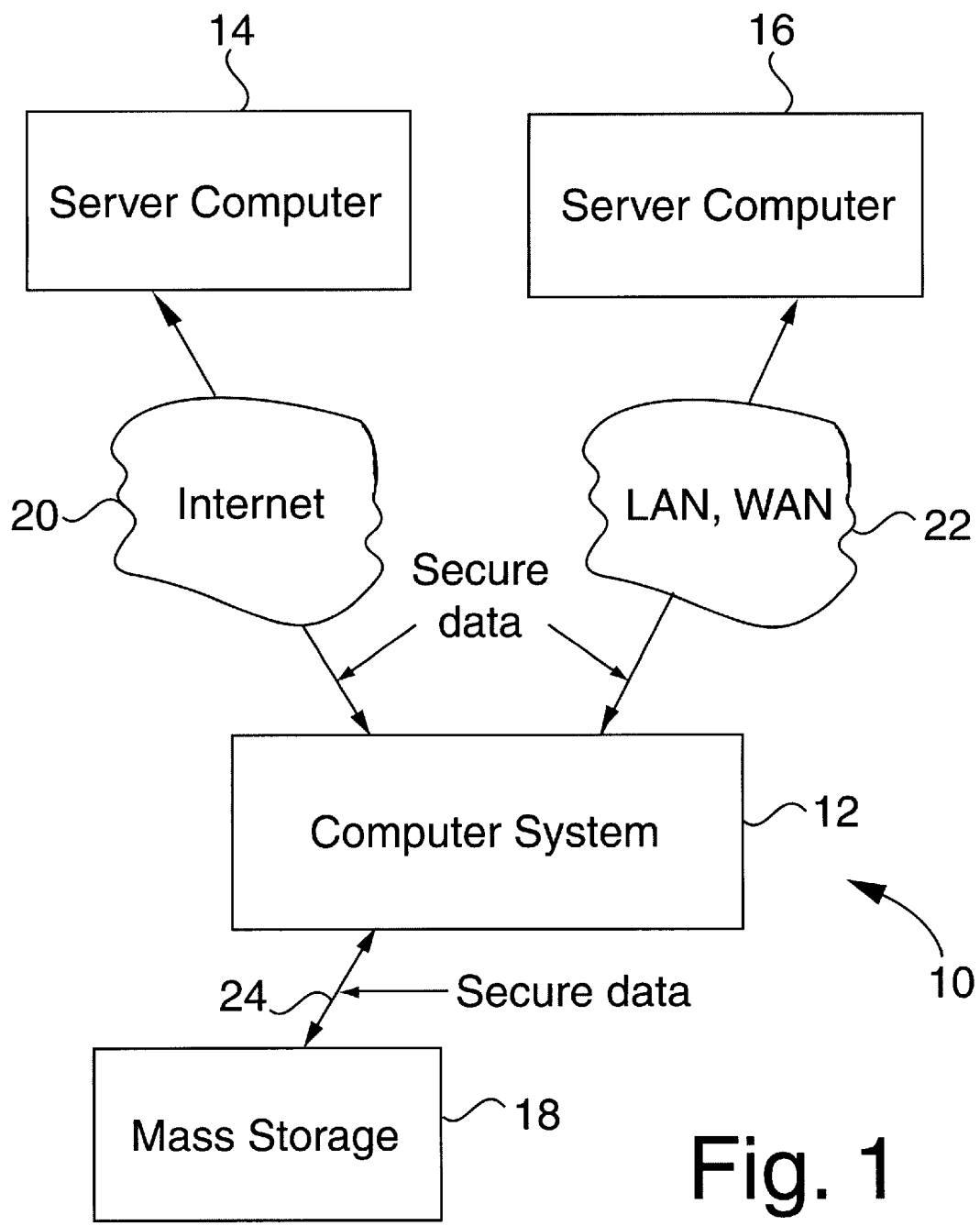
FIG. 1 is a block diagram of a computer system engaging in secure data communications with other devices while using an embodiment of the present invention.

FIG. 1 illustrates a scenario 10 in which a computer system 12 is involved in a variety of secure communications with a server computer 14, a server computer 16 and mass storage 18. Computer system 12 includes a security unit of the present invention in order to receive any encrypted messages from any of the server computers and/or mass storage and to decrypt these encrypted messages with assistance from the attached security unit. Encrypted messages may also be sent from computer system 12 to any of the server computers and/or mass storage devices and be decrypted within those devices by using an equivalent of the security unit.

Computer system 12 that receives and/or transmits encrypted messages may be any suitable computer system including a workstation, a desktop computer, a laptop computer, a portable computer, a personal digital assistant (PDA) (such as those made by Apple Computer, Inc., U.S. Robotics, Inc., etc.), a cellular telephone, a digital handset using personal communication services (PCS) or other wireless device, or any other computing device which has a need for receiving or transmitting secure information.

Server computer 14 may be any suitable computer used to provide information over a network such as an Internet 20. Such an Internet 20 may be a corporate Internet or corporate Intranet or even the current world-wide Internet. Server computer 16 is any suitable computer attached to a local area network (LAN) or to a wide area network (WAN) 22 that can provide information. Mass storage device 18 may be any suitable device for storing information and for transmitting information over an interface 24 to computer system 12. Mass storage 18 may be a floppy disk drive, a hard disk drive, a CD-ROM, an optical disk drive or any similar device.

Although the present invention may be used by a computer system to not only receive encrypted information but also to transmit encrypted information, the following description refers to that aspect of the invention in which a computer system receives encrypted information and is able to decrypt that information by way of assistance from the security unit.

Figure 2:
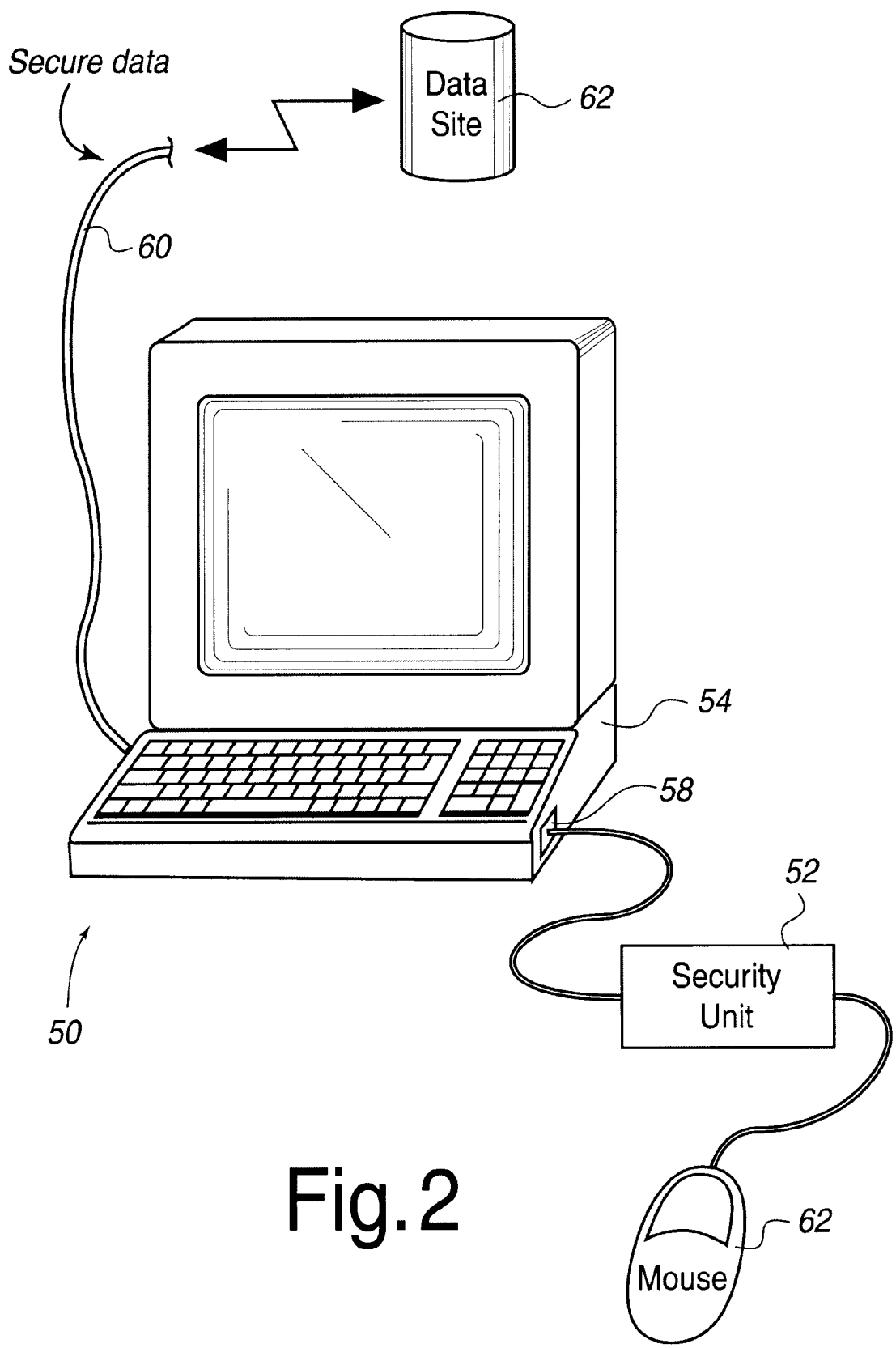
FIG. 2 illustrates an embodiment of the invention in which a security unit attached to the mouse port of a laptop computer assists in decrypting secure data provided from a data site.

FIG. 2 illustrates an embodiment of a computer system 50 in which the security unit 52 of the present invention is attached between a laptop computer 54 and a mouse 56. In this example, security unit 52 attaches to mouse port 58 of the laptop computer which is conveniently located towards the front of the computer. Computer 54 communicates via a data link 60 in order to receive secure information from a data site 62. Data site 62 may be present within any of the server computers of FIG. 1 or may be equivalent to mass storage 18 of FIG. 1. Data link 60 may take a wide variety of forms. By way of example, data link 60 may be a standard cable, an infrared communication link, a telephone line link, a satellite link, a microwave link, or any type of wireless link such as a Ricochet wireless modem provided by Metricom, Inc. Once that encrypted information has been transferred from data site 62 to computer 54, then security unit 52 is able to provide secret encryption information to computer 54 in order to enable the computer to decrypt the information from the data site.

Figure 3:
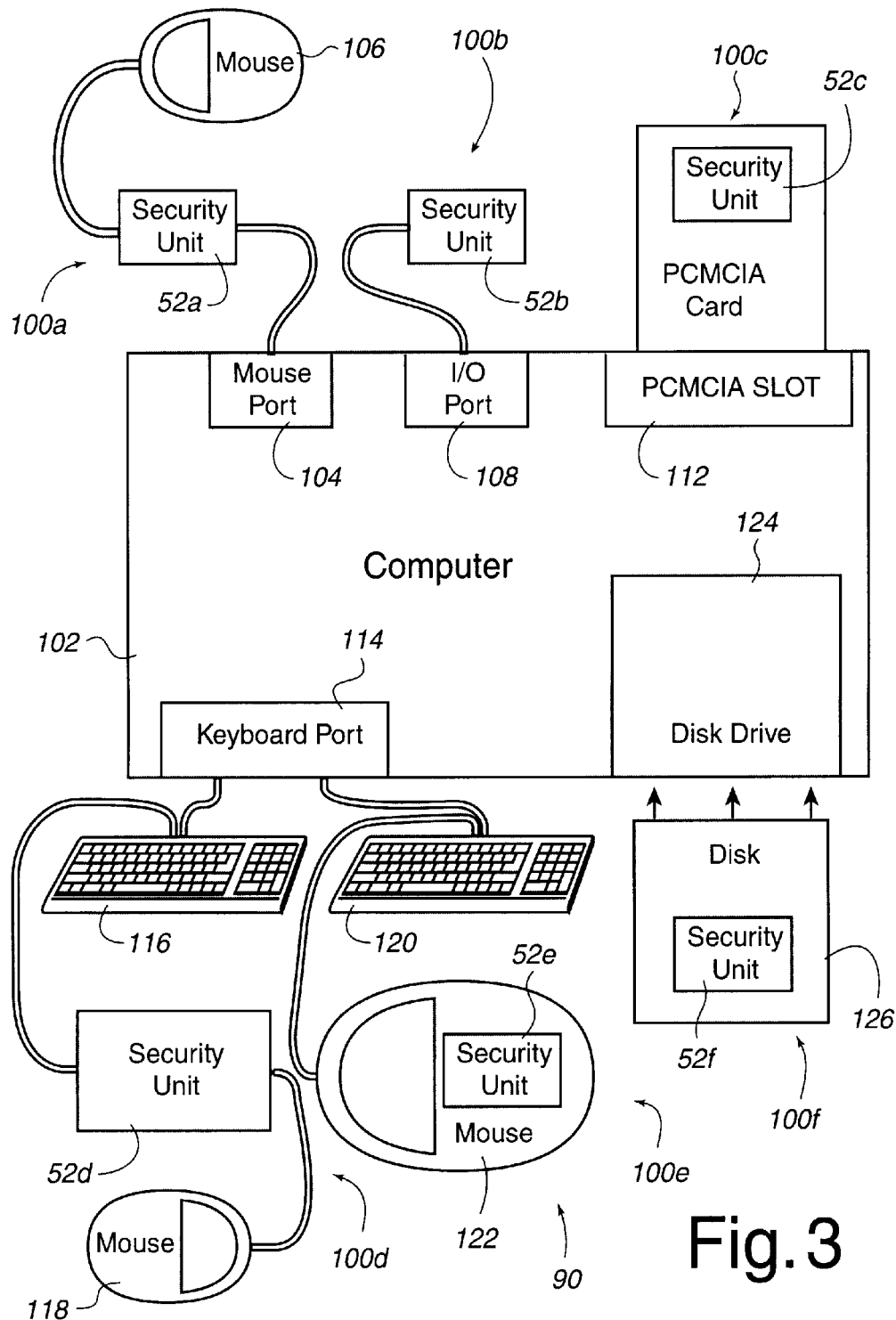
FIG. 3 illustrates various embodiments of the invention in which the security unit may attach to a computer in a variety of ways.

FIG. 3 illustrates a variety of embodiments 90 in which any of security units 100a through 100f attach to a computer 102. FIG. 3 shows multiple security units 52a through 52f to illustrate the variety of ways in which a security unit may communicate with a computer; in actual operation only one security unit is required. In embodiment 100a security unit 52a attaches to computer 102 in between mouse port 104 and mouse 106. During normal use, signals from mouse 106 pass through the security unit to the computer. When data is to be decrypted within the computer, the mouse button of mouse 106 is used to initiate the sending of encryption information from the security unit to the computer. In embodiment 100b security unit 52b is attached by itself to I/O port 108 of the computer. A wide variety of I/O ports may be used for this purpose. By way of example, I/O port 108 may be a serial port, a parallel port, an SCSI port, a PS/2 port, a keyboard port, an infrared port, or any other suitable port. In the embodiment of 100c, security unit 52c is present upon a PCMCIA card 110 that is inserted into PCMCIA slot 112 of the computer.

In the embodiment of 100d a keyboard port 114 of the computer is used and security unit 52d is located between a keyboard 116 and a mouse 118. Embodiment 100e also uses keyboard port 114 to which is attached a keyboard 120, but in this embodiment security unit 52e is present inside mouse 122. In the embodiment of 100f a disk drive 124 of the computer is used to receive a disk 126 on which the security unit 52f is present. Disk 126 may be any suitable disk such as a floppy disk, hard disk, CD-ROM, optical disk, or the like. The security unit may also communicate with the computer not by a direct hardwired link, but also by way of any of the wireless links mentioned above. Thus, it should be appreciated that the security unit may be connected to the user's computer in many different ways, and only a few examples are presented here.

Figure 4:
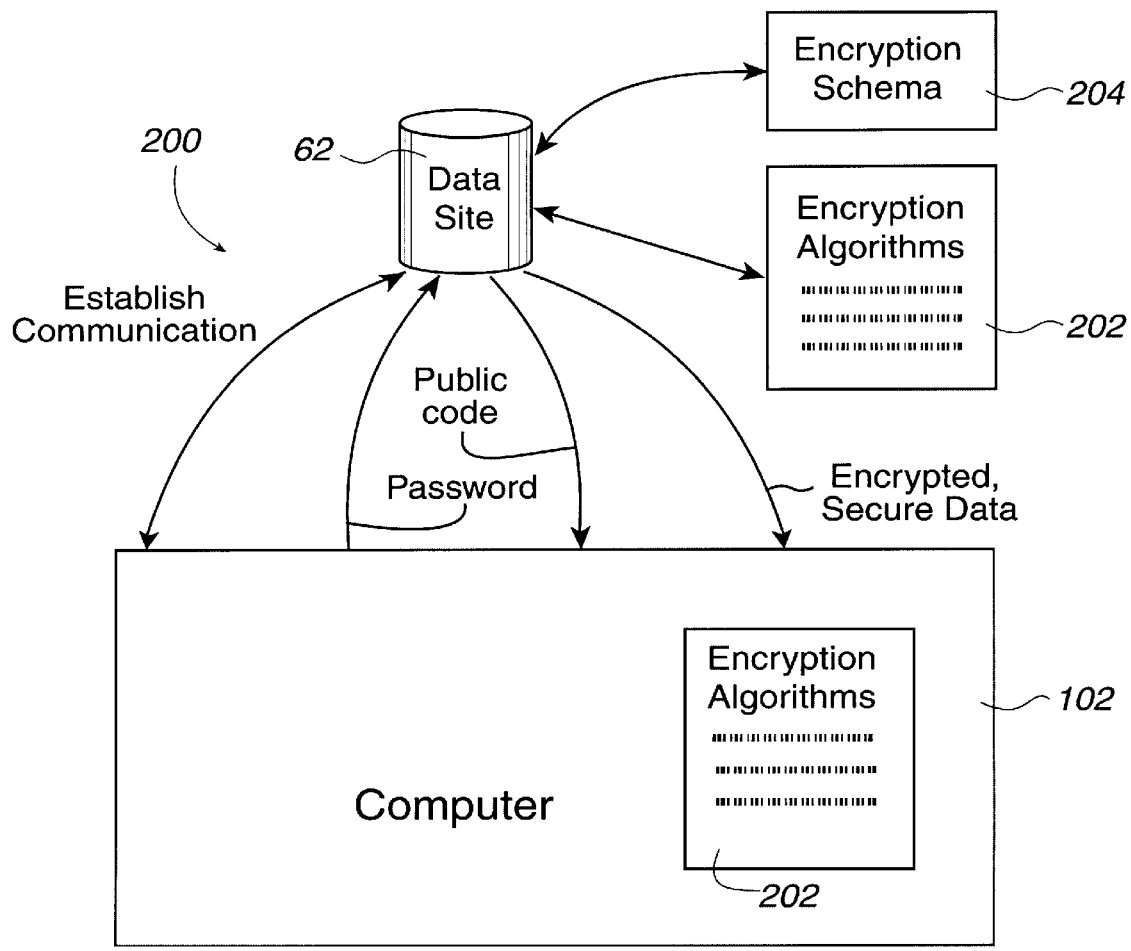
FIG. 4 illustrates symbolically the flow of information between a data site and a computer and between the computer and a security unit.
Figure 4:
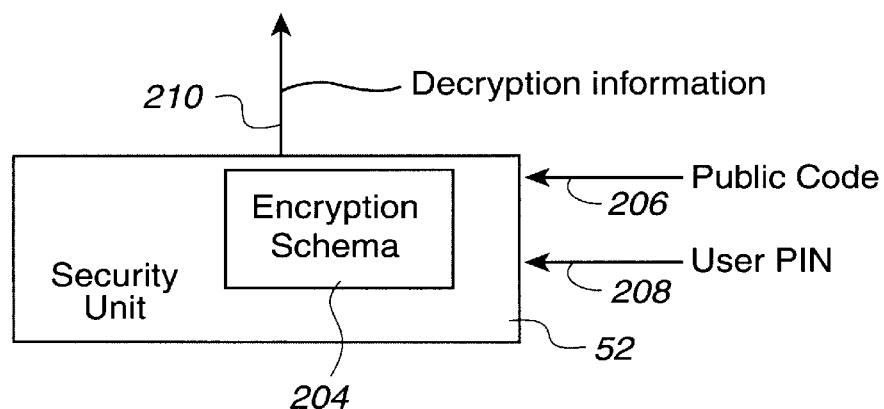

FIG. 4 illustrates a scenario 200 in which encrypted information from data site 62 is decrypted by computer 102 with the assistance of security unit 52. Data site 62 includes the secure information that the user of computer 102 wishes to transfer. Data site 62 also includes access to a set of encryption algorithms 202 and an encryption schema 204. Encryption algorithms 202 are also included in computer 102 and encryption schema 204 is also present within security unit 52. A public code 206 and a user PIN 208 are input to the security unit in order to provide the decryption information 210 to computer 102.

Encryption algorithms 202 may be any suitable set of algorithms used to encrypt information. It is possible that only one encryption algorithm is used to encrypt a message sent from the data site to the computer, although the present invention contemplates that greater data security is provided by using any number of encryption algorithms for different portions of a single message. Encryption algorithms 202 may use bit manipulation, bit substitution, exchanging bits, ORing bits, ANDing bits, character transformation, character movement or any other more complex encryption schemes for encrypting information not requiring transmission of a key together with the encrypted information.

In one embodiment of the invention, an encryption algorithm not only encrypts a string of data in place, but also moves the string to a different location, swapping positions with the string to whose location it moves. The algorithm moves bit strings around so that they no longer are in the sequence or location that they occupied when the message was initially built. Thus, even if an encryption algorithm could be broken for a particular string, the strings within a block of data may be even further jumbled. An encryption algorithm identified in the schema and whose identity is transmitted to the computer would perform the function of moving a string and also manipulating the string. An algorithm may simply move sequences of bits within the string which it is decoding, or it may also move strings of bits within the complete message transmitted. The algorithm would also make use of a memory map to indicate which strings had been moved where and if a string had already been encrypted once or not.

Strings moved forward in the message would be exchanged with a string of equal length at that point. The forward-moving string would not be altered at that time, but instead the exchanged string would be encrypted according to the algorithm, or vice-versa. If it is desirable to only move and/or encode a string once, then the memory map may be consulted to determine if the data at a given point had itself been moved, before allowing it to be exchanged with another string. If it has already been moved, the algorithm can either re-compute string length or position in order to place the string into an unaltered location. The memory map may be built as encryption takes place moving forward through the data message. Such a technique further inhibits hacking of the data message as the encryption is even more dynamic. An encryption algorithm for moving data may treat a data block as circular (i.e., the beginning follows the end), or could keep re-computing a move location until it falls within the data block. Given a known length, a binary division of the move pointer and string length would be a simple and effective solution. Once the data message has been encrypted in such a dynamic way, decryption may be performed by referencing the encryption algorithms used to encrypt the data. Decryption would also build its own memory map locally in much the same way as the encryption process does.

Encryption schemamer is a random array of bits both used in the encryption of information at the data site and in the decryption of the same information at computer 102. In one embodiment of the invention, encryption schema 204 contains 1M bits of random information in memory. As will be explained in greater detail below in the flow charts of FIGS. 7 and 8, encryption schema 204 is accessed randomly to provide random sets of bits that identify not only an encryption algorithm to use for a portion of the message to be encrypted, but also identify the number of characters or bytes to encrypt using that identified encryption algorithm. Because encryption schema 204 is also present within security unit 52, the computer 102 is able to decrypt the transferred information. Advantageously, neither encryption algorithms 202 nor encryption schema 204 are transmitted from the data site to the computer along with the secure data. There may be one encryption schema used for a variety of users, or there may be a unique encryption schema for each user of a security unit. If so, then a user identifier and/or password is used at the data site to associate a particular user and security unit with its unique encryption schema at the data site.

The user begins by establishing communication between his computer 102 and the data site 62. When the user desires to access secure information, he transmits a password to the data site to permit the data site to identify the unique encryption schema that is also present within the user security unit 52. The data site then generates and transmits a random public code 206 in the clear to computer 102 so that the user may enter the public code into the security unit. At this point the data site encrypts and sends the secure data to computer 102.

Public code 206 is a random sequence of numbers, letters and/or symbols that are generated by data site 62 and transmitted in the clear to computer 102. Once received by computer 102, public code 206 is viewable and may be entered into the security unit by the user. Public code 206 can also be transmitted to the user in other ways. A user also has a unique user PIN which he or she has memorized and has also entered into the security unit. Data site 62 uses a combination of the public code and the unique user PIN to produce a first unique entry point into that encryption schema associated with the user PIN.

Security unit 52 combines public code 206 and user PIN 208 in the same fashion as in data site 62 in order to produce an identical entry point into encryption schema 204. Thus, in this fashion security unit 52 has access to the same set of random bits that data site 62 has used to encrypt the message sent to computer 102. These random sets of bits are sent as decryption information 210 from security unit 52 to computer 102 in order to assist in the decryption of the message. Computer 102 then makes use of this decryption information in conjunction with the encryption algorithms 202 stored within in order to decrypt the data. The setup and usage phases for the transfer of secure information are described in greater detail below with reference to FIGS. 7 and 8. Algorithms 202 may already be present on computer 102 or may be transferred from the data site to the computer independent of the data. Alternatively, algorithms 202 may be present within unit 52 and may be transferred from the unit to the computer for use in decryption. For greater security, algorithms 202 are not transferred along with any message.

Figure 5:
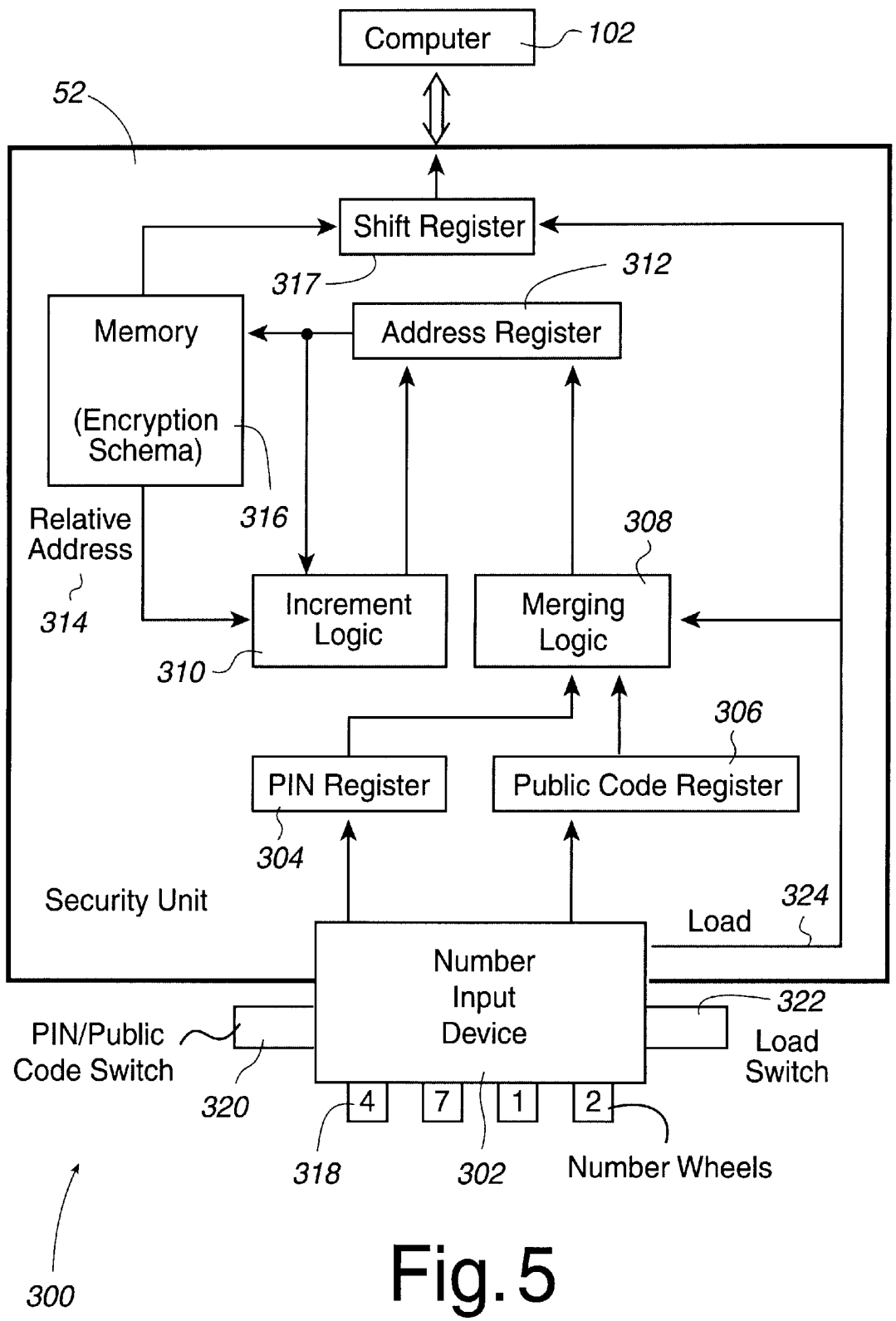
FIG. 5 is a block diagram showing in greater detail one embodiment of the security unit of FIG. 4.

FIG. 5 illustrates an embodiment 300 of a security unit 52 that communicates with computer 102. Security unit 52 includes a number input device 302 for inputting a number into either a PIN register 304 or public code register 306. The contents of these two registers are combined using merging logic 308 in order to produce an address which is stored in address register 312. Increment logic 310 is used to receive the contents of address register 312 and a relative address 314 from memory 316 in order to provide a new address for address register 312. Shift register 317 is used to transfer selected data from memory 316 through to computer 102.

Number input device 302 may be any suitable type of input device used for entering numbers, letters, and/or symbols into security unit 52. In one embodiment of the invention, simple number wheels 318 are used to enter a sequence of numbers. In the example shown, the number "4712" is being entered into the input device. The use of a rotary number wheel or thumb wheels are for illustration only; any other method of selecting numbers may also be used such as buttons, a dial, switches, electronic input, etc. In one embodiment of the invention, a single number input device is used to enter numbers for both PIN register 304 and public code register 306. In this embodiment, a PIN/public code switch 320 is used to select between entering a PIN or a public code. A load switch 322 directs the number present on the input device to be shifted into the register indicated by PIN/public code switch 320. For example, when switch 320 is depressed, then the input number is transferred to PIN register 304 when load switch 322 is activated; when switch 320 is not depressed then the input number is transferred to public code register 306 when load switch 322 is activated. Of course, other hardware and/or techniques may also be used to perform this function. Upon activation, load switch 322 also produces a load signal 324 that directs merging logic 308 to combine the two registers to produce a first address, and also directs shift register 317 to begin shifting the selected algorithms and length of strings from memory 316 to computer 102.

The contents of PIN register 304 and public code register 306 are combined using merging logic 308 in order to produce a unique, random address that indicates a first entry point into the encryption schema contained within memory 316. This first entry point is stored in address register 312. Merging logic 308 may be any type of hardware logic or software that combines registers 304 and 306 in order to produce a first entry point. Memory 316 is any suitable hardware memory that contains the random bits of the encryption schema. Increment logic 310 uses any suitable hardware logic or software in order to add the contents of address register 312 to the received relative address 314 from memory 316 in order to produce a new random address to be stored in address register 312. Relative address 314 may be simply added or subtracted to the current address, or the two addresses may be combined in any fashion to produce a new random address using increment logic 310.

In an alternative embodiment of the invention, the security unit may be implemented in software on the user's computer. In this embodiment, the CPU of the computer in conjunction with various of the computer's input/output devices and memory of the computer would perform the functions of security unit 52. The storage of a PIN, public code, addresses and the logic computation may be accomplished in any suitable programming language. Also, data entry could be from the keyboard or any suitable input device, and the schema could be stored on a floppy or hard disk. A floppy disk including a schema and/or algorithms and/or combining logic would allow for portability from computer to computer, while processing is still performed on a CPU of a host computer.

Figure 6:
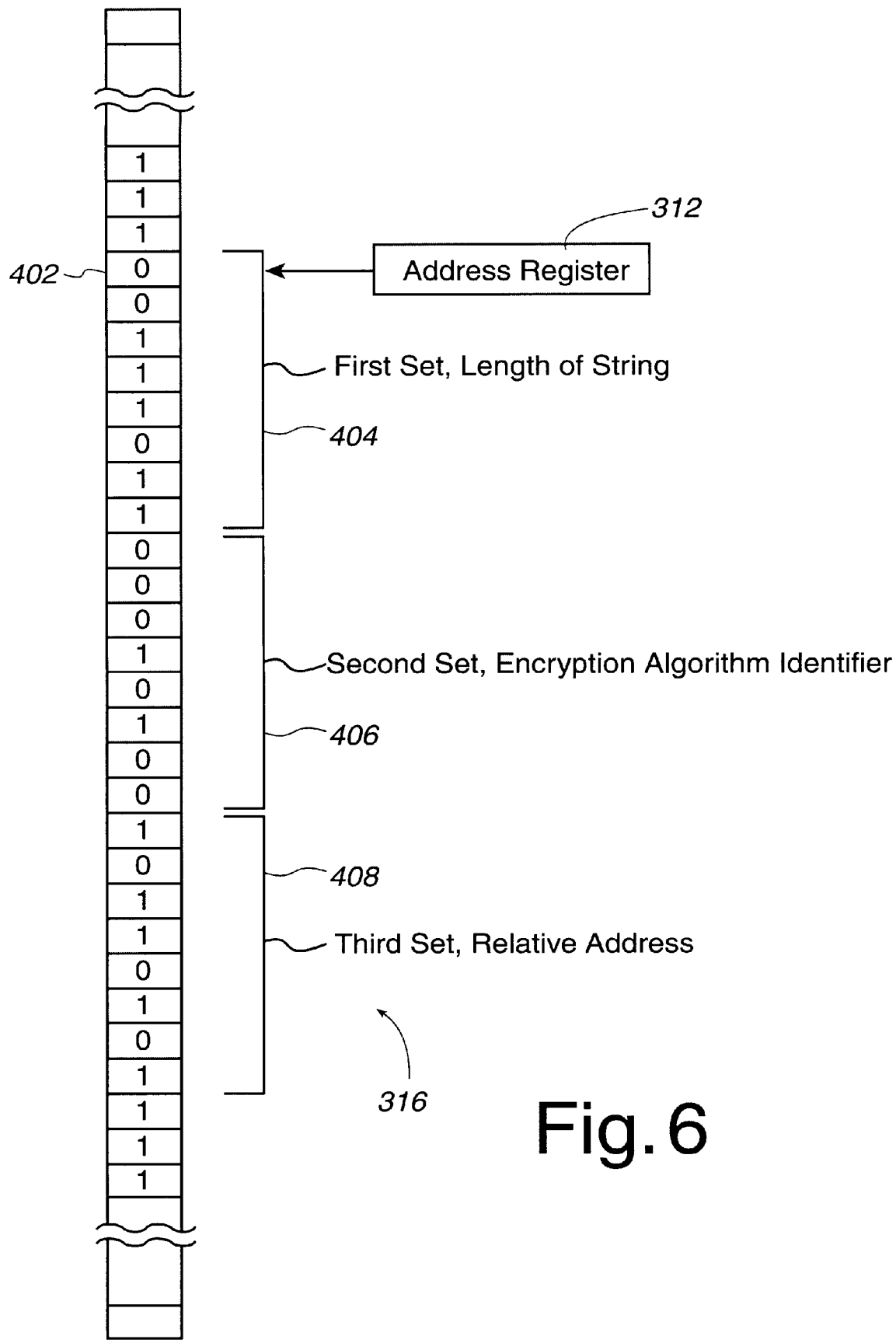
FIG. 6 shows symbolically one embodiment of the contents of the memory of the security unit of FIG. 5.

FIG. 6 shows symbolically memory 316 of security unit 52 of FIG. 5. Memory 316 may be any suitable memory, by way of example, a flash memory may be used. In this illustrative example, memory 316 contains a sequential series of random bits, although memory 316 may be structured in any suitable fashion. Address register 312 indicates an entry point at a random address 402 of memory 316 in order to access random sets of bits for use in encryption and decryption. From address 402 are indicated a first set of bits 404, a second set of bits 406 and a third set of bits 408. In this example, a length of eight bits has been used for each set, although a different number of bits can be used, and each set could be of a different length. Set 404 indicates the length of the string within the message to be encrypted by a particular encryption algorithm. This length could indicate a number of bits, bytes, characters, words, etc. In this example, set 404 indicates a length corresponding to the binary number "00111011". The following second set of bits 406 represents another binary number that indicates an encryption algorithm identifier. This identifier indicates which of many encryption algorithms shall be used to encrypt the string whose length is indicated by set 404. In this example, set 406 indicates an identifier corresponding to the bits "00010100". This identifier is used by a server computer or a host computer to identify an encryption algorithm to use. A third set of bits 408 indicates a random relative address to be used with increment logic 310 in choosing a new random address within memory 316.

It should be appreciated that FIG. 6 is an example only and that by convention these sets of bits may be modified in any fashion. For example, both the data site and the security unit may agree that any other number of bits may be used for each set of bits, and that the sets may appear in any order. Also, the sets of bits need not be consecutive, but may be spaced apart within the memory or may be offset using any agreed upon number or scheme.

Figure 7:
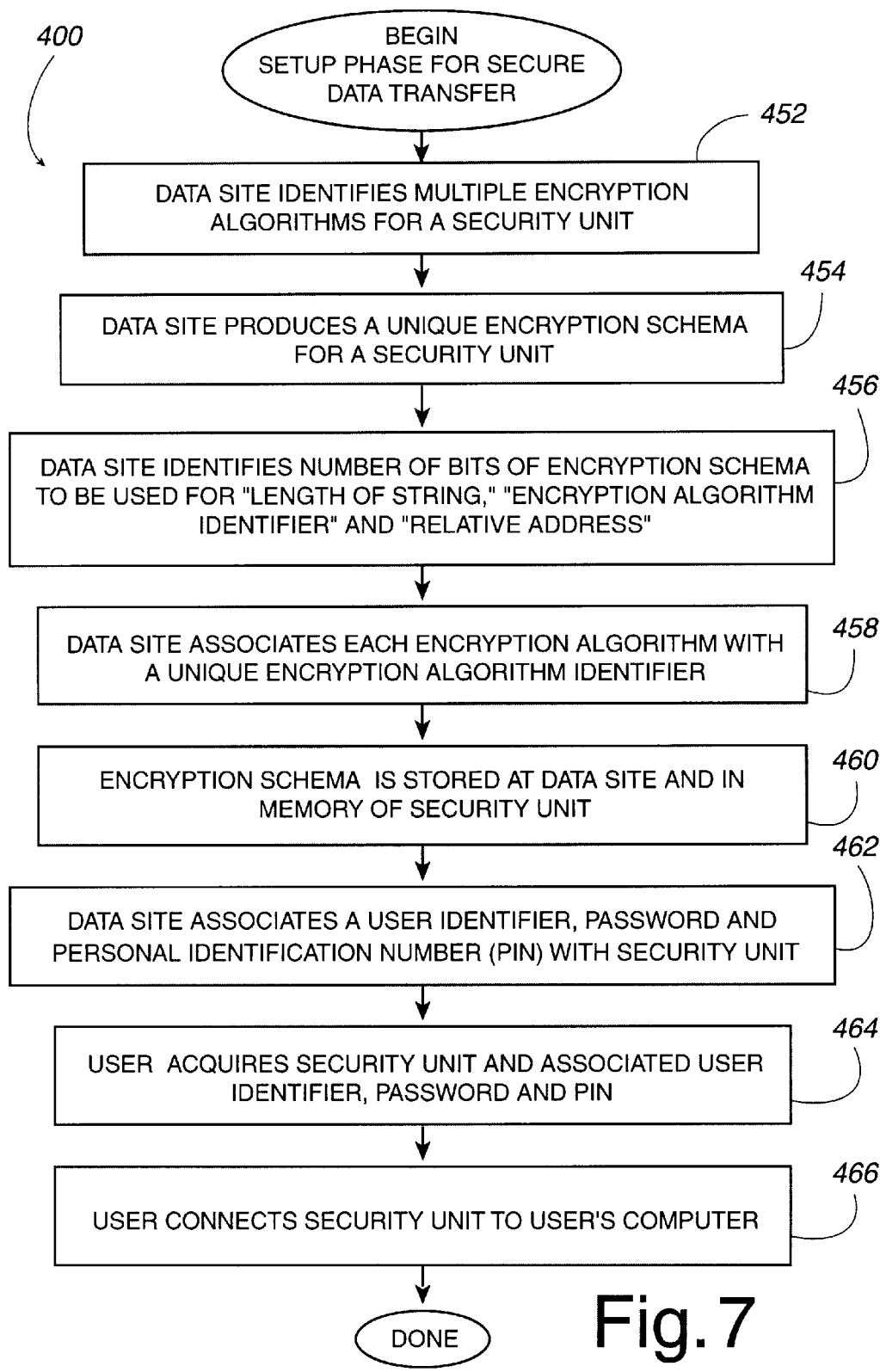
FIG. 7 is flow chart illustrating an embodiment of a setup phase for secure data transfer using the security unit of the present invention.

FIG. 7 is a flowchart 400 representing an embodiment of a setup phase for the present invention. The setup phase is used to create a unique encryption schema and to store this schema not only at the data site, but also within the security unit that is then attached to a user's computer. Once the setup phase is complete, then the user may transfer encrypted information and decrypt it. In step 452 the data site identifies multiple encryption algorithms that will be used to encrypt portions of information within a particular message to be sent to a user. It is contemplated that a unique set of multiple encryption algorithms will be associated with a particular security unit, and thus a particular user, although it is possible that the same encryption algorithms could be used for any number of security units. In step 454 a unique encryption schema is produced for the particular security unit. As in step 452, it is contemplated that there will be a unique encryption schema for each security unit, although it is possible that one encryption schema may be used for any number of security units. This encryption schema is a random series of bits, bytes, and/or words that is preferably stored in a memory device of a computer at the data site.

Once an encryption schema has been identified for a particular security unit, the data site in step 456 then agrees upon a convention to use for the sets of bits that will be accessed within the encryption schema. The data site identifies the number of bits to be used to represent the "length of string", the "encryption algorithm identifier", and the "relative address". The data site also identifies the relative location of these three sets of bits in relation to an entry point indicated by the address register. As an illustrative example, FIG. 6 shows that in one embodiment each of the three sets of bits is 8 bits in length and they begin at the location indicated by the address register and follow consecutively thereon. Of course, other conventions are possible.

For large amounts of data to be transmitted, it may be desirable to agree upon a convention whereby a block of data to be transmitted is kept to a reasonable size so that each block of data may be decrypted rapidly on the user's computer, and the user may view the information in chunks as it is decrypted. By way of example, data may be broken up into no more than 4K byte chunks. Each block is encrypted by the data site and decrypted by the user computer according to the present invention; i.e., random algorithms and random length strings are used within each block. In this way, a user is allowed to view a block of information rapidly, without having to wait for a large amount of data to be decrypted.

In step 458 the data site associates each of the multiple encryption algorithms with a unique encryption algorithm identifier. For example, if there are four encryption algorithms and the encryption algorithm identifier is two bits in length, then each encryption algorithm is assigned a unique number from 0 to 3. Of course, a wide variety of encryption algorithm identifiers and techniques for associating an identifier with an algorithm may be used.

Once an encryption schema has been produced at the data site, then in step 460 this encryption schema is stored in a memory at the data site and is also stored in the memory of its corresponding security unit. The data site also associates a user identifier, and/or a password and a personal identification number (PIN) with the security unit at step 462. The user identifier is a human readable identifier such as the user's name that is for convenience in identifying a particular user with a security unit. The password associated with a security unit is used to identify a particular security unit and its corresponding encryption schema. The PIN associated with a particular security unit and encryption schema is used to uniquely access an entry point in the encryption schema by combining the PIN with a public code. In step 464 the user acquires the security unit along with the associated user identifier, password and PIN. In step 466 the user connects the security unit to the user's computer and is now ready to transfer encrypted information and to decrypt it.

Figure 8A:
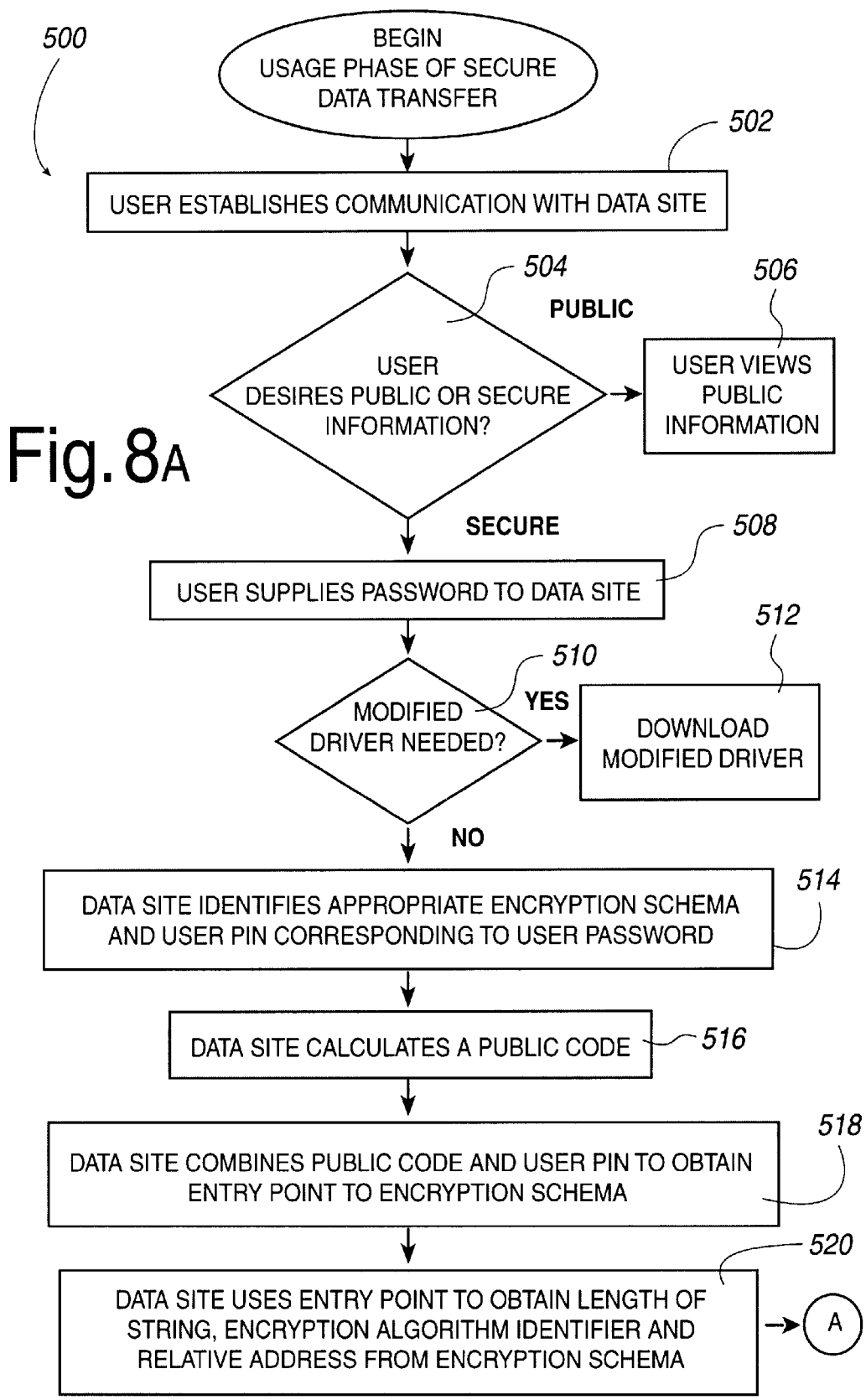

FIGS. 8A and 8B are a flowchart 500 illustrating a technique by which a user may transfer encrypted information and then decrypt it in a secure fashion using an embodiment of the present invention. In step 502 the user establishes communication between his computer and a data site. If the data site is located on a server computer that is part of the Internet, then communication may be established using a web browser and a URL address. If the data site is part of a LAN or WAN then communication may be established in any standard fashion. Step 504 determines whether the user desires to view public or secure information. If the user desires to view public information then in step 506 the user may transfer this information and view it without the need for the information to be encrypted. However, if the user desires to view secure information that must be transferred in an encrypted form, then the following steps take place.

In step 508 the user supplies his password to the data site. This password is transmitted in the clear and is used to tell the data site who is communicating with it and which encryption schema to use to encrypt information to be sent. Step 510 determines whether a modified driver may be needed by a user's computer. For example, if the user connects the security unit between the mouse and mouse port of his computer, it may be necessary to use a slightly modified mouse driver software for receiving information from the security unit. If such a modified driver is needed, then in step 512 this modified driver is downloaded from the data site to the user's computer and is installed as the current driver. In step 514 the data site identifies the appropriate encryption schema and user PIN that corresponds to the password that the user has supplied. In this fashion, the data site has identified an encryption schema and a user PIN that will also be used by the user in his security unit. This insures that information encrypted using the encryption schema and user PIN will be able to be decrypted by the user on any computer.

In step 516 the data site calculates a public code. This public code may be any sequence of numbers, letters, and/or symbols that is used to access the encryption schema. Both the data site and the security unit at the user's computer will combine the same user PIN and public code in order to access the same encryption schema. In step 518 the data site combines this public code with the user PIN to obtain an entry point into the encryption schema. This entry point represents a random address into the encryption schema and serves as a starting point for determining the first length of string, encryption algorithm identifier and relative address. Thus, in step 520 the data site uses this entry point to obtain three sets of bits that correspond to the first length of the string to be transmitted, an encryption algorithm identifier and a relative address. In step 522 the data site encrypts a first part of the information to be sent to the user using the encryption algorithm identified by the encryption identifier. The length of the part of the information to be encrypted is determined by the "length of string" number determined from the encryption schema in step 520. Now that a first part of the information has been encrypted, the data site continues to randomly access the encryption schema to determine the next part of the information to encrypt and to determine which encryption algorithm to use to encrypt it.

Thus, in step 524 the data site combines the relative address obtained in step 520 with the address of the current entry point to obtain a new entry point into the encryption schema. Because the original entry point and the relative address are both random numbers, and because they may be combined in any random fashion, the new entry point into the encryption schema will also be a random entry point. In step 526 the data site continues to encrypt all of the information to be sent to the user as described in step 522. For example, the new entry point into the encryption schema identifies three new sets of bits that correspond to the next "length of string", the "encryption algorithm identifier", and the next "relative address". Using these three new sets of numbers, the next part of the information to be transmitted is encrypted using the appropriate algorithm and a new entry point is calculated using the most recently obtained relative address. This process of calculating new entry points into the encryption schema and determining new encryption algorithms for portions of the information continues until all of information is encrypted. In step 528, the data site sends this encrypted information to the user. It should be appreciated that once the information has been encrypted it may be sent to the user at any time. For example, the information may be sent to the user as soon as all of it has been encrypted, it may be sent at a later time after the public code has been sent to the user, or each part of the information may be sent continuously to the user as it is encrypted by the data site. In step 530 the data site sends the public code it has calculated to the user in the clear. Of course, the public code may also be transmitted at any time.

Now that the encrypted information has been transmitted to the user's computer and the user has received the public code, the user is ready to decrypt the information on his computer. In step 532, the user selects the "PIN" setting of the PIN/public code switch on the number input device of the security unit and enters the PIN on the security unit. In this step, the PIN is thus transferred into the PIN register 304 of the security unit 52. In step 534 the user selects the "public code" setting of the PIN/public code switch and enters the public code on the number input device of the security unit. Thus, this step transfers the public code into public code register 306 of the security unit.

Next, in step 536 the security unit combines the PIN and the public code to obtain an entry point into the encryption schema. In one embodiment of the invention, this combination is performed by merging logic 308 of the security unit and the entry point is stored in address register 312. Because the data site has previously combined the same public code and the same PIN using the same combination technique, the entry point obtained by the security unit into the encryption schema will the same entry point obtained by the data site previously in step 518. Thus, both the data site and the security unit are synchronized with respect to where to begin within the encryption schema for encryption/decryption. Because the encryption schemas are the same for each, similar sets of bits are obtained from the encryption schemas.

In step 538 the security unit uses this first entry point to obtain three sets of information corresponding to first "length of string," "encryption algorithm identifier", and "relative address" from the encryption schema. Because both the security unit and the data site are following the same convention for the length of each of these sets of information and where they are located in relation to the entry point, the security unit will obtain the same values as the data site for these three sets. Using the value for "relative address", the security unit uses increment logic 310 to combine the relative address with the current address to place a new entry point into address register 312. This new entry point will be the same new entry point as calculated in step 524 for the data site because the addresses are both the same and because increment logic 310 used by the security unit uses the same logic as the data site in step 524 to combine the two addresses. In this fashion, the security unit continues to calculate new entry points and obtain groups of values for the quantities "length of string", "encryption algorithm identifier", and "relative address" until a predetermined number (previously agreed upon with the data site) of these groups of values are obtained.

In step 540 the security unit sends these multiple pairs of the quantities "length of string" and "encryption algorithm identifier" to the user computer. (The quantity "relative address" need not be sent to the computer.) Any quantity of these pairs of values may be sent to the computer. The computer will decrypt data sent from the data site until these values are all used up. For example, if the security unit transfers 100 pairs to the computer, the computer will decrypt the data sent using the 100 identified algorithms and the 100 length of strings. If all the data has been decrypted using less than the 100 groups, then no more need be sent. If, however, more encrypted data remains after the 100 pairs have been used up, then the user will be prompted to perform a reset to obtain more pairs from the unit. Alternatively, the data site may prompt for a reset, or it may occur automatically.

If the security unit has been placed between the computer mouse and the mouse port, then data may be sent from the security unit to the computer by simulating a mouse click or a series of mouse clicks. For example, the unit may simulate a mouse click for each pair of values to be transmitted to the computer, or a number of clicks may be simulated for each pair to be sent. As described above, a modified mouse driver may be used to recognize these pairs of values rather than the regular mouse signals. In one embodiment of the invention, the data is sent from the unit upon activation of the "load" switch as described above in FIG. 5.

Once the computer has received the length of string quantities indicating how much of the encrypted message to decrypt with each decryption algorithm, and has received the various encryption algorithm identifiers indicating which encryption algorithm to use, the computer may then in step 542 decrypt the encrypted information and produce information readable by the user. It should be appreciated that the "length of string" and "encryption algorithm identifier" quantities may be transmitted from the security unit to the computer in a variety of fashions. By way of example, in the above-described steps, this information is sent as a whole to the computer. In another embodiment, as each quantity is identified with the encryption schema it may be sent on to the computer.

In one embodiment of the invention, the mouse button may also be used to select a new entry point into the encryption schema and to initiate the sending of the "length of string" and "encryption algorithm identifier" on to the computer in much the same way that the "load" switch operates.

In an alternative embodiment, by comparing the "length of string" quantities received from the security unit with the length of the encrypted message received from the data site, the computer may indicate to the user when it has received all of the appropriate quantities of information and/or when it needs more quantities.

Once the original secure information requested by the user has been decrypted in step 542, the user may wish to view more secure information, in which case the multiple pairs loaded from the unit in step 540 are continued to be used until used up. If these pairs are all used up, or become used up in the course of decrypting the additional secure information, then new pairs may be obtained from the unit as described above in step 540. If the user wishes to view public information in the clear, then that information may be requested from the data site to be downloaded unencrypted. If secure data is then requested after viewing public data, then the equivalent of a reset occurs and control returns to step 516.

A reset may also occur anywhere in the process in order to synchronize the data site and the security unit or to ensure a higher level of security. For example, if the user has difficulty reading the decrypted information, or is unable to decrypt the information, then the user may send a reset command to the data site requesting that a synchronization occur. In this instance, the data site will calculate a new public code, combine the new public code with the user PIN, choose a new entry point into the encryption schema, and encrypt the information to be sent all over again using the above techniques. This new public code and newly encrypted information is then transmitted to the user again and the user may again attempt to decrypt the received information by entering the new public code and the user PIN on his security unit.

Also, at any time during the transmission of information, the data site may request a reset itself. The data site would then calculate a new public code, etc., and send to the user the new public code and newly encrypted information. The user must then enter the new public code and his user PIN again in order to decrypt subsequent information being sent from the data site. This forced reset by the data site may be used to ensure that an authorized user is still present at the computer and/or to ensure that the user PIN has been entered correctly. A forced reset may also be used by the data site in order to further heighten security of the transmitted information to the user's computer.

A reset may also be accomplished automatically. For example, a known sequence of bits is embedded in the message and is looked for by the user computer. If the sequence is detected in the correct place, then both are synchronized and no reset need occur. However, if not detected, then the user computer reprocesses the last algorithm until the sequence is detected. If still unsuccessful, then a manual reset is forced. This technique works well with high-volume high-speed data.

COMPUTER SYSTEM EMBODIMENT

Figure 9:
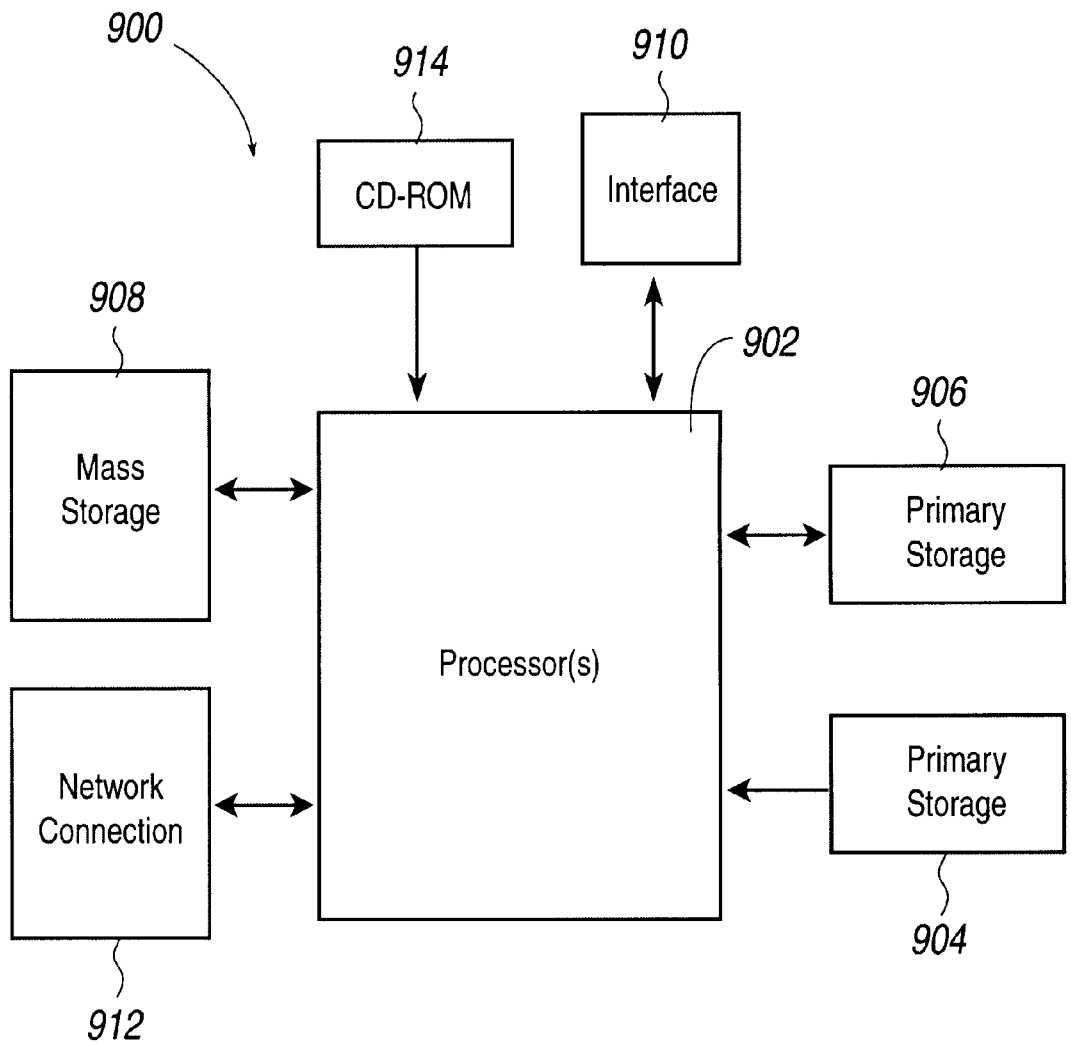
FIG. 9 is a block diagram of a typical computer system suitable for use with an embodiment of the present invention.

FIG. 9 illustrates a computer system 900 that may be used with an embodiment of the present invention. Computer system 900 includes any number of processors 902 (also referred to as central processing units, or CPUs) that are coupled to storage devices including primary storage 906 (such as random access memory, or RAM) and primary storage 904 (such as a read only memory, or ROM). As is well known in the art, primary storage 904 acts to transfer data and instructions unidirectionally to the CPU and primary storage 906 is used typically to transfer data and instructions in a bidirectional manner. Both of these primary storage devices may include any suitable of the computer-readable media described below. A mass storage device 908 is also coupled bi-directionally to CPU 902 and provides additional data storage capacity and may also include any of the computer-readable media described below. Mass storage device 908 may be used to store programs, data and the like and is typically a secondary storage medium (such as a hard disk) that is slower than primary storage. It will be appreciated that the information retained within mass storage device 908, may, in appropriate cases, be incorporated in standard fashion as part of primary storage 906 as virtual memory. A specific mass storage device such as a CD-ROM 914 passes data unidirectionally to the CPU.

CPU 902 is also coupled to an interface 910 that includes one or more input/output devices such as such as video monitors, track balls, mice, keyboards, microphones, touch-sensitive displays, transducer card readers, magnetic or paper tape readers, tablets, styluses, voice or handwriting recognizers, biometrics readers, or other computers. CPU 902 optionally may be coupled to another computer or telecommunications network using a network connection as shown generally at 912. With such a network connection, it is contemplated that the CPU might receive information from the network, or might output information to the network in the course of performing the above-described method steps.

In addition, embodiments of the present invention further relate to computer storage products with a computer readable medium that have program code thereon for performing various computer-implemented operations. The media and program code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Figure 10:
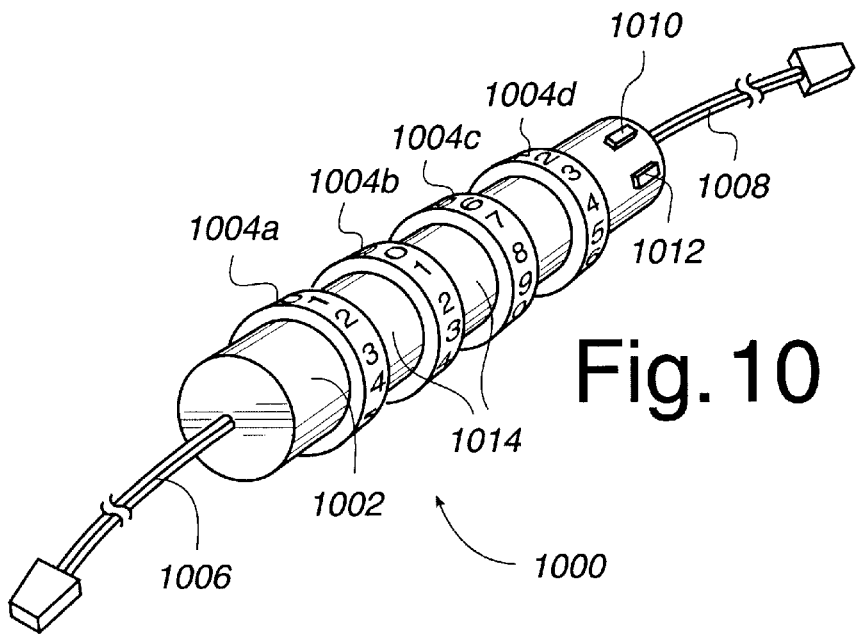
FIG. 10 is a perspective view of an alternate embodiment for a security unit.

An alternate embodiment for a security unit 1000 is illustrated in FIG. 10. The security unit 1000 includes a cylindrical body 1002 including a number of thumb-wheels 1004*a*–1004*d*, a pair of cables 1006 and 1008, and a pair of buttons 1010 and 1012.

The thumb-wheels 1004*a*–1004*d* include, in this example, the number 0, 1, 2, . . . , 9. Other indicia (such as letters), or fewer or more indicia can also be used. The thumb-wheels are caused to rotate around an axis of cylindrical unit 1002, until selected numbers align with a mark 1014. The thumb-wheels control switches capable of inputting the numbers specified by the thumb-wheels into the security unit 1000. In this fashion, for example, a personal identification number (PIN) or a public code can be input into the security unit 1000. In this example, a user has rotated the various thumb-wheels 1004*a*–1004*d* to enter the numbers "3184" into the security unit 1000. Of course, other mechanisms for entering numbers, such as a rotary "combination-lock" type mechanism, could also be used for entering the numbers to the security unit 1000.

The button 1012 is preferably an output or "load" control button which is used to indicate from where the signal to the computer is coming, as described previously. In one position, the button 1012 indicates that the signal to the computer is coming from the mouse, and in another position the button 1012 indicates that the signal to the computer is coming from an internal processor of the security unit 1000. That is, button 1012 can, in effect, inactivate the security unit 1000 such that the signals from the mouse pass through the security unit, or it can activate the security unit 1000 so that the security process of the present invention can be implemented.

The button 1010 is preferably a PIN/public reset button. That is, the button 1010 indicates what the numbers on the thumb-wheels represents. In button one position, the numbers on the thumb-wheels represent a private code (i.e. a PIN), and in another button position the button 1010 indicates that the numbers on the thumb-wheels represent a public code provided by some public source.

The cables 1006 are used to connect the security unit to a computer and to a peripheral device. For example, cable 1006 can be coupled to a mouse input port of a computer, while cable 1008 can be coupled to a mouse. Of course, other types of coupling arrangements can be used. For example, cable 1008 can be replaced by a mouse input port on the security unit 1000 such that the cable from the mouse can be plugged directly into the security unit 1000. Other types of connector and cable arrangements are well known to those skilled in the art.

Figure 11:
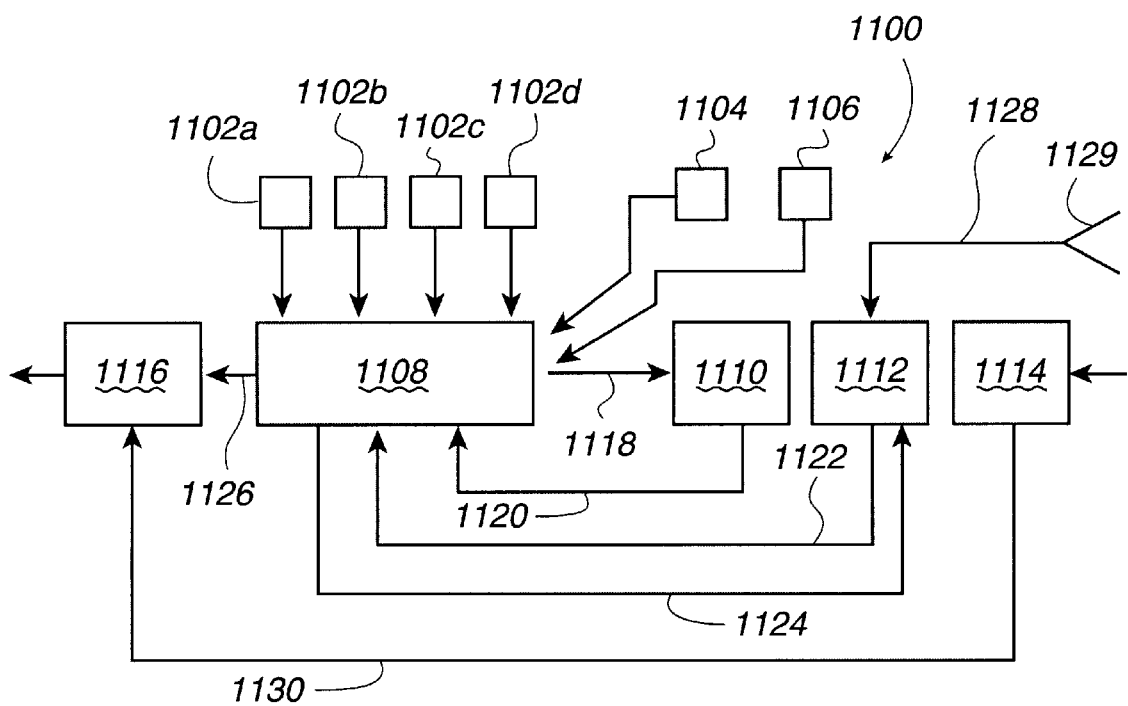
FIG. 11 is a block diagram of electrical components of the security unit of FIG. 10.

The electronic circuitry 1100 for one embodiment of the security unit 1000 is illustrated in FIG. 11. The circuitry 1100 includes a number of switches 1102a–1102d which correspond to thumb wheels 1004a–1004d, respectively. It also includes switches 1104 and 1106 which correspond to buttons 1012 and 1010, respectively.

The circuitry further includes a microcontroller or microprocessor 1108, ROM memory 1110, writeable memory 1112, an input buffer 1114, and an output buffer 1116. The switches 1102a–1102d, 1104, and 1106 are all coupled to inputs of the microprocessor 1108. The microprocessor 1108 is also coupled to ROM 1110 by busses 1118 and 1120, to writeable memory by busses 1122 and 1124, and to output buffer 1116 by bus 1126. The writeable memory 1112 is coupled by a bus 1128 to a port 1129, and the input buffer 1114 is coupled to the output buffer 1116 by a bus 1130.

An advantage of the embodiment of circuitry 1100 is that, in addition to the ROM 1110, a writeable memory 1112 is provided. That is, the encryption schema in ROM 1110 is fixed, while the encryption schema in memory 1112 can be changed. The writing to the memory 1112 can be via port 1129 which can be, for example, connected to a serial port of the computer. That is, a new encryption schema can be downloaded to the computer, and then downloaded into the memory 1112 from via port 1129. The memory 1112 is preferably a writeable, but non-volatile, memory such as Flash memory, EEPROM memory, etc.

The memory 1112 can be further segmented into multiple encryption schemas. However, the memory will be described as including only a single schema for ease of description, it being understood that the memory is fully capable of supporting multiple downloaded schema.

The ROM memory 1110 is personal to a user and corresponds to that user's PIN number. It functions as described previously. The writeable memory 1112 can hold a "public" schema, e.g. one assigned by a particular company. This, for example, allows a company to provide secure data for its employees without having to store a separate encryption schema for each employee. This, as another example, could also be used by Internet content providers to allow a public password to be made available for its paying customers. The public encryption schema is preferably changed from time to time to ensure that only current employees or paying customers have access to the information. Since two encryption or more encryption schemas can be provided by this system, a user can always be assured of accessing his or her personal data (encrypted with his or her personal encryption schema), but can also access other data as desired and permitted.

It should be noted that since the public encryption schema can be accessed by a number of different users, each of which will have their own PIN, the system must provide a "public code" that corresponds to that PIN. That is, if a certain memory address in the public encryption schema is to be accessed with different PINs, it is clear that a public code that corresponds to that PIN must be provided to provide the correct starting address within the schema.

Although the foregoing invention has been described in some detail for purposes of clarity of understanding, it will be apparent that certain changes and modifications may be practiced within the scope of the appended claims. For instance, the security unit may attach to a user's computer in many ways or even be present inside of the computer. Furthermore, the unit may connect to any port of the computer, or use any other suitable method for transmitting its contained encryption information to the computer. Alternatively, the unit could be implemented in software on the user's computer and utilize the computer's CPU rather than being a separate unit. Both a user PIN and public code may be used for accessing the encryption schema, or only one may be used or a multitude of other codes and/or numbers may be used. The logic within the unit can be implemented using any suitable digital or analog hardware, or may also be implemented in software. The sets of data stored in the schema may be ordered in any fashion or be of any length, and may refer to any units of data that may be stored. The user's computer may decrypt the received information as information is received from the unit, or it may wait until all of the information is received. Also, the unit may be used to provide for secure data communications between a hard disk of a computer and RAM in order to provide a safeguard for confidential data on a computer, such as on a hard disk of a laptop computer.

It is therefore intended that the following appended claims be interpreted as including all permutations, alterations, additions, and equivalents as fall within the true spirit and scope of the present invention.

What is claimed is:

1. A security apparatus comprising;
   a number input device;
   an address register responsive to said number input device;
   an encryption schema memory storing an encryption schema including a random array of bits, said on schema memory addressable by said address register to produce both an output code including a length of spring identifier and an encryption algorithm identifier, and a relative address code; and
   address incrementing logic responsive to said relative address code and operative to increment said address register,
   whereby said encryption algorithm identifier identifies a particular encryption algorithm utilized to encrypt a set of data having a length defined by said length of string identifier.

2. A security apparatus as recited in claim 1 further comprising:

a PIN register coupled to said number input device;

a public code register coupled to said number input device; and merging logic merging outputs of said PIN register and said public code register to be input to said address register.

3. A security apparatus as recited in claim 2 further comprising an output shift register operative to shift out said output code of said encryption schema memory.

4. A security apparatus as recited in claim 1, wherein said encryption schema memory is read only memory.

5. A security apparatus as recited in claim 1, wherein said encryption schema memory includes a writeable memory.

6. A security apparatus as recited in claim 1 wherein said random array of bits consists of 1M bits of random information.

7. A security apparatus as recited in claim 1 wherein said length of said data set defined by said length of string identifier is randomly determined.

8. A security apparatus as recited in claim 7 wherein said length of said data set although random is no greater than a predefined length.

9. A security apparatus as recited in claim 1 wherein said security apparatus is a portable device which when in operation must be coupled to a host computer system said host computer performing said encryption utilizing said output code, whereby security is enhanced as the identification of said particular encryption algorithm utilized and said length of said data set encryted by said particular encryption algorithm is determined by said security apparatus which being a device separate from said host computer system decreases risks of security attacks.

10. A security apparatus as recited in claim 6 wherein security apparatus plugs into a peripheral device port of said host computer system.

11. A security apparatus as recited in claim 7 wherein peripheral device port is a mouse port.

12. A security apparatus as recited in claim 6 wherein said security apparatus is operable to draw any needed power from said host computer system.

13. A security apparatus as recited in claim 1 wherein said number input device is an electro-mechanical device manually actuated to enter a sequence of numbers.

14. A security apparatus as recited in claim 10 wherein said electro-mechanical device includes a plurality of number wheels.

15. A security apparatus as recited in claim 1 wherein said number input device is an electronic input device.

16. A security apparatus comprising:

a processor;

a plurality of memories coupled to said processor, where each memory stores an encryption schema including a random array of bits;

a number input device coupled to said processor to at least partially provide a starting address for at least one of said plurality of memories; and an address register process executing on said processor, said address register process maintaining an address register variable initially storing said starting address, said address register process operable to access at least one of said encryption schemas in order to generate a length of string identifier, an encryption algorithm identifier, and a relative address code;

an address incrementing process executing on said processor, said address incrementing process responsive to said relative address code and operable to increment said address register variable, whereby said encryption algorithm identifier identifies a particular encryption algorithm utilized to encrypt a set of data having a size defined by said length of string identifier.

17. A security apparatus as recited in claim 16 wherein at least one of said plurality of memories is a read-only memory, and wherein at least one of said memories is a writeable memory.

18. A security apparatus as recited in claim 17 further comprising an output port coupled to said processor, and an input port coupled to said output port.

19. A security apparatus as recited in claim 18 further comprising a downloading port separate from said input port for downloading encryption schema into said writeable memory.

* * * * *

UNITED STATES PATENT AND TRADEMARK OFFICE
CERTIFICATE OF CORRECTION

PATENT NO.     : 6,094,486                                              Page 1 of 1
DATED          : July 25, 2000
INVENTOR(S)    : Brian E. Marchant It is certified that error appears in the above-identified patent and that said Letters Patent is hereby corrected as shown below:

Column 16,
Line 49, reads: "1. A security apparatus comprising;" ; it should read
-- 1. A security apparatus comprising: --;
Line 54, reads: "schema including a random array of bits, said on"; it should read
-- schema including a random array of bits, said encryption --;
Line 57, reads: "spring identifier and an encryption algorithm identifier," ; it should read
-- string identifier and an encryption algorithm identifier, --;

Column 17,
Line 29, reads: "said length of said data set encryted by said particular" ; it should read
-- said length of said data set encrypted by said particular --;
Line 33, reads: "10. A security apparatus as recited in claim 6 wherein" ; it should read
-- 10. A security apparatus as recited in claim 9 wherein --;
Line 34, reads: "security apparatus plugs into a peripheral device port of said" ; it should read -- said security apparatus plugs into a peripheral device port of said --;
Line 36, reads: "11. A security apparatus as recited in claim 7 wherein said" ; it should read -- 11. A security apparatus as recited in claim 10 wherein said --;
Line 38, reads: "12. A security apparatus as recited in claim 6 wherein said" ; it should read: -- 12. A security apparatus as recited in claim 9 wherein said --;

Column 18,
Line 1, reads: "14. A security apparatus as recited in claim 10 wherein" ; it should read -- 14. A security apparatus as recited in claim 13 wherein --;

Signed and Sealed this

Thirteenth Day of August, 2002

*Attest:*

*Attesting Officer*

JAMES E. ROGAN
*Director of the United States Patent and Trademark Office*